(12) United States Patent
Houston et al.

(10) Patent No.: US 12,253,438 B2
(45) Date of Patent: Mar. 18, 2025

(54) SYSTEMS AND METHODS FOR ACOUSTIC PROCESS MONITORING AND CONTROL

(71) Applicant: United States Postal Service, Washington, DC (US)

(72) Inventors: Edward F. Houston, Bristow, VA (US); Manfred Foxx-Gruensteidl, Amissville, VA (US)

(73) Assignee: United States Postal Service, Washington, DC (US)

( * ) Notice: Subject to any disclaimer, the term of this patent is extended or adjusted under 35 U.S.C. 154(b) by 287 days.

(21) Appl. No.: 18/057,180

(22) Filed: Nov. 18, 2022

(65) Prior Publication Data

US 2023/0160783 A1 May 25, 2023

Related U.S. Application Data

(60) Provisional application No. 63/264,335, filed on Nov. 19, 2021.

(51) Int. Cl.
| | |
|---|---|
| *G01M 99/00* | (2011.01) |
| *G08B 21/18* | (2006.01) |
| *G10L 25/63* | (2013.01) |
| *H04R 1/08* | (2006.01) |

(52) U.S. Cl.
CPC .......... *G01M 99/00* (2013.01); *G08B 21/182* (2013.01); *G10L 25/63* (2013.01); *H04R 1/08* (2013.01)

(58) Field of Classification Search
CPC ...... G01M 99/00; G08B 21/182; G10L 25/63; H04R 1/08
USPC .......................................... 381/56, 58, 57, 59
See application file for complete search history.

(56) References Cited

U.S. PATENT DOCUMENTS

2017/0193436 A1* 7/2017 Taylor ................. G06Q 10/087

* cited by examiner

*Primary Examiner* — Thjuan K Addy
(74) *Attorney, Agent, or Firm* — Knobbe, Martens, Olson & Bear LLP

(57) ABSTRACT

In a content management system for customizing and controlling data distribution, data items can be customized and dispersed to disparate reception terminals according to various control mechanisms where they can convey relevant information to local or remote stakeholders. Data items can be integrated into existing data distribution structures in real time according to applicable control mechanisms and distribution protocols. Data resources can be efficiently used in distributing data under predefined and configurable conditions. Control mechanisms and distribution protocols can be determined based on an interested user's recognized status within the system. Design of the distribution system allows for informed delivery of essential information in a controlled and automated fashion such that users can interact with the system in receiving or distributing current and relevant information across the distribution network for others to access.

20 Claims, 5 Drawing Sheets

SYSTEMS AND METHODS FOR ACOUSTIC PROCESS MONITORING AND CONTROL

This application claims the benefit of U.S. Provisional Application Ser. No. 63/264,335, filed Nov. 19, 2021, titled "SYSTEMS AND METHODS FOR ACOUSTIC PROCESS MONITORING AND CONTROL," the entirety of which is incorporated by reference herein.

FIELD

This disclosure relates to systems and methods for acoustic monitoring and/or control of equipment and processes.

BACKGROUND

Various enterprises such as distribution networks, manufacturers, and the like, frequently operate facilities including automated or partially automated equipment that should be monitored. Improved systems and methods for monitoring operating equipment may provide a number of advantages, including reduced downtime, efficient implementation of preventive maintenance, and improved safety.

SUMMARY

In a first aspect, an acoustic monitoring system comprises one or more acoustic sensors disposed on, within, or proximate one or more pieces of equipment, the one or more acoustic sensors configured to record sound; and a server in communication with the one or more acoustic sensors, the server comprising memory and one or more processors. The one or more processors are configured, for each individual acoustic sensor of the one or more acoustic sensors, to monitor, using the acoustic sensor, sound generated by the component during subsequent operation of the one or more pieces of equipment to generate operational audio signature data; compare the operational audio signature data to stored baseline audio signature data; determine that the operational audio signature data corresponds to an abnormal condition associated with the at least one component based on comparing the operational audio signature data to the stored baseline audio signature data; and generate an alert indicative of the abnormal condition.

In some embodiments, the at least one component comprises at least one of a linear servo actuator and a linear pneumatic actuator.

In some embodiments, the baseline audio signature data comprises at least one quantitative value calculated based on the recorded sound. In some embodiments, the one or more processors detect the abnormal condition based on a difference between the at least one quantitative value and a corresponding quantitative value of the operational audio signature data exceeding a threshold.

In some embodiments, the one or more processors are further configured to detect operation of the one or more pieces of equipment, and to trigger the monitoring based on detecting the operation of the one or more pieces of equipment.

In some embodiments, the one or more processors are further configured to determine a type of the abnormal condition, and the alert is generated based on the type of the abnormal condition. In some embodiments, the abnormal condition comprises a malfunctioning one of the at least one component and the alert causes, at least in part, a repair of the malfunctioning component. In some embodiments, the one or more processors are further configured to monitor sound generated by the malfunctioning component subsequent to the repair to verify effectiveness of the repair.

In some embodiments, determining the type of the abnormal condition comprises comparing, by the one or more processors, the operational audio signature data to one or more stored example audio signatures associated with known types of abnormal conditions.

In some embodiments, the one or more processors are in communication with control circuitry of the piece of equipment including the component, the one or more processors further configured to detect, based on the operational audio signature data, a human distress sound associated with the piece of equipment; and cause the piece of equipment to cease operating based on the detected human distress sound.

In some embodiments, the system further comprises at least one camera, the one or more processors further configured to detect an abnormal condition based on a correlation of the operational audio signature data with still image data or video image data captured by the at least one camera.

In a second aspect, a method for monitoring equipment comprises placing one or more acoustic sensors of an acoustic monitoring system on, within, or proximate one or more pieces of equipment and, for each individual acoustic sensor of the one or more acoustic sensors, monitoring, using the acoustic sensor, sound generated by the component during subsequent operation of the one or more pieces of equipment to generate operational audio signature data; comparing, by a server processor of the acoustic monitoring system, the operational audio signature data to the baseline audio signature data; detecting an abnormal condition associated with the component based on comparing the operational audio signature data to the stored baseline audio signature data; and generating an alert indicative of the abnormal condition.

In some embodiments, the baseline audio signature data comprises at least one quantitative value calculated based on the recorded sound. In some embodiments, the abnormal condition is detected based on a difference between the at least one quantitative value and a corresponding quantitative value of the operational audio signature data exceeding a threshold.

In some embodiments, the method further comprises detecting operation of the one or more pieces of equipment; and triggering the monitoring based on detecting the operation of the one or more pieces of equipment.

In some embodiments, the method further comprises determining a type of the abnormal condition, and the alert is generated based on the type of the abnormal condition. In some embodiments, the abnormal condition comprises a malfunctioning one of the at least one component and the alert causes, at least in part, a repair of the malfunctioning component. In some embodiments, the method further comprises monitoring sound generated by the malfunctioning component subsequent to the repair to verify effectiveness of the repair.

In some embodiments, the method further comprises controlling the one or more pieces of equipment based at least in part on the alert. In some embodiments, the method further comprises detecting, based on the operational audio signature data, a human distress sound associated with the piece of equipment; and causing the piece of equipment to cease operating based on the detected human distress sound.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1:
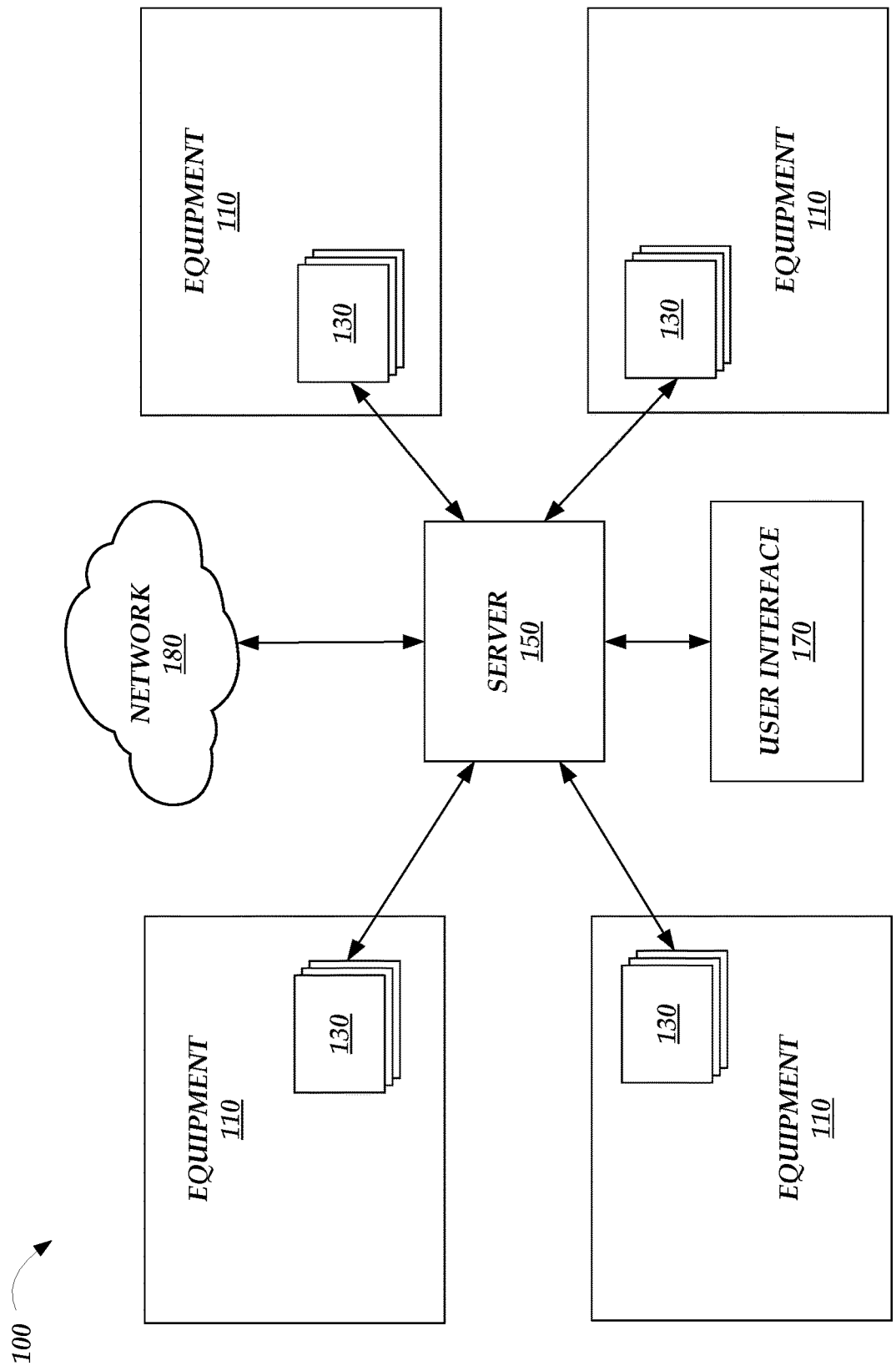
FIG. 1 is a block diagram schematically illustrating an example acoustic process monitoring system implemented in a distribution network.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the disclosed technology. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

Mechanical equipment, such as mail processing equipment, may include a variety of components such as motors, actuators, bearings, linkages, belts, fans, pulleys, rollers, conveyors, or other mechanical or electrical elements that operate during ordinary operation of the equipment, as well as static components such as air hoses or other conduits. The various components of any piece of equipment are capable of failing or malfunctioning during sustained or recurrent operation. In mechanical systems, a failure or malfunction may result from a sudden breakage and/or from gradual wear and tear, even when the system is properly maintained through preventive maintenance. The condition and operation of equipment and components can be monitored using cameras, sensors, and/or periodic human inspections. However, many equipment components operate in locations where it is difficult or impossible to place cameras, and certain types of damage, such as wear and tear of components, may be difficult or impossible to detect with existing sensors prior to failure or malfunction. While inspection by human technicians may be implemented, frequent inspections by human technicians may be expensive and time-consuming, especially for entities operating a large number of pieces of equipment, such as a distribution network, and may result in an undesirable amount of equipment downtime. In some embodiments, particular components can be advantageously monitored, such as those which represent single point failures, components whose failure would cause damage at other points in the machine/equipment if action is not taken quickly, and high value components.

The present technology provides for improved monitoring of processes and/or equipment by implementing sound-based acoustic monitoring. In accordance with the present technology, microphones or other acoustic sensors capable of detecting and/or recording sound are placed on, within, and/or near equipment being monitored. For example, individual acoustic sensors may be placed so as to detect sounds generated by moving and/or static components or subcomponents of a piece of equipment. The monitored components or subcomponents may or may not be expected to produce a sound during operation in a normal or nominal operational state; the acoustic monitoring systems disclosed herein may thus be configured to detect the absence of an expected operational sound, the presence of an unexpected operational sound, and/or the presence of an operational sound that differs from an expected operational sound. A baseline audio signature may be collected and/or stored based on operation of a piece of equipment in a normal operational condition. One piece of equipment, or a component or group of components of a piece of equipment can have multiple baseline audio signatures. For example, a piece of equipment can have different baseline audio signatures based on the particular operation or task the equipment is performing, the type of item the equipment is processing, etc. For example, when item processing equipment is performing a single pass sorting operation, when a belt is being driven at a low speed, etc., the equipment or components can have a separate baseline audio signature as compared to when the item processing equipment is performing a two pass sorting operation, when a belt is being driven at a high speed, etc. In some embodiments, components and subcomponents can have multiple or variable baseline audio signatures based on external factors, such as time of day; weather conditions, such as humidity, precipitation, or the like; the facility shift, i.e., morning, evening, midnight, swings, etc.; operations of nearby equipment; and the like.

The external factors may influence the baseline audio signature that a particular sensor on a piece of equipment senses or is attuned to. For example, in the mornings, a facility may have different ambient sounds than in the evening. A first or morning shift may run a particular array of equipment for a beginning of day sort, sorting a first type of items, and the evening shift may involve sorting a second type of items, or the operation of different equipment near the monitored equipment, which can change the ambient sounds or the sounds the sensors on a particular piece of equipment or component sense or pick up. Baseline audio signatures for each different operating condition can be prepared, stored, and used for monitoring under the specific operating conditions. A server or facility computing device can automatically determine, based on various inputs, which operating conditions exist in the facility around the monitored equipment and can instruct other processors, equipment, components, etc., or select the appropriate baseline audio signature based on the time of day, type of operation, or other operating conditions. One of skill in the art, guided by this disclosure, will understand that other conditions or factors not specifically listed can be considered within the scope of this disclosure.

In some embodiments, the audio baseline signature can be established by recording or capturing sounds, vibrations, etc., of a piece of equipment when it is operating under many different external or ambient conditions. For example, the equipment can be operated and audio captured in the morning, evening, and afternoon, on each operational shift, under different weather, humidity, and temperature conditions, and the like. The audio baseline signature for the equipment can be established by removing from the recording the sounds/signals from the various captures which change or vary depending the shift, on the external conditions, etc., such that a baseline for the equipment can be established, removing noise or background that could obscure or interfere with the acoustic monitoring of the particular equipment. The implementation of multiple baseline audio signatures may advantageously permit the use of acoustic monitoring systems and methods without requiring costly or performance-affecting modifications that might otherwise be needed to isolate acoustic sensors from external noise in some embodiments.

The equipment may be monitored thereafter by recording the equipment in operation and comparing an operational audio signature to the stored baseline audio signature. If an abnormal audio signature is detected during monitoring, a monitoring system may generate an alert and/or automatically take appropriate action to address or resolve the abnormal condition.

Acoustic monitoring of equipment operation in accordance with the present technology has a number of advantages over conventional monitoring and inspection methods. For example, unlike image-based monitoring (e.g., using a video camera or still images), acoustic monitoring can readily be implemented in dark locations and/or without direct line-of-sight between the sensor and the component. Miniature acoustic monitoring devices may also be small enough to be placed within existing equipment not designed to accommodate operational monitoring sensors. These and other advantages of the present technology will be described in greater detail herein.

Although the acoustic process monitoring systems and methods of the present technology are primarily described herein with reference to equipment and facilities of a distribution network, the present disclosure is not intended to be limited to distribution networks. It will be understood that the systems, methods, and/or any components thereof as described herein may equally be applied to the monitoring and/or control of any type of equipment capable of producing an acoustic signature during operation. Various example contexts in which the present technology may be applied include, but are not limited to, manufacturing facilities, distribution networks such as postal networks, warehouses, recycling or other waste handling facilities, construction and/or demolition, transportation settings such as the monitoring of air, land, and/or sea vehicle components, or the like.

Certain embodiments of the disclosure will now be described in connection with the figures. The figures are meant to aid in understanding the disclosed technology and only provide example embodiments. Other embodiments may be implemented in accordance with the disclosure herein and appended claims. In the interest of brevity, only a sample of such embodiments will now be described.

FIG. 1 is a block diagram illustrating an acoustic process monitoring system 100 implemented in a distribution network. As shown, the example acoustic process monitoring system 100 may include one or more pieces of equipment 110, monitoring devices 130, and a server 150. In some embodiments, the server 150 is in wired or wireless communication with a user interface 170 and/or a network 180.

The pieces of equipment 110 may include any type of equipment that is capable of producing a sound when operating in a normal and/or abnormal operational state. Although four pieces of equipment 110 are illustrated in FIG. 1, the acoustic process monitoring system 100 may be configured for monitoring any number of pieces of equipment 110, from a single piece of equipment 110 up to tens, hundreds, or thousands of pieces of equipment 110. The term pieces of equipment 110 can also refer to components of equipment which can be individually or monitored in groups. In the non-limiting example implementation of a distribution network that distributes items such as mailpieces, letters, flats, parcels, and the like, equipment 110 can include various machines, apparatus, or devices, such as one or more sorters, facer-canceler systems, conveyors, loading or unloading devices (e.g., rotationally and/or linearly actuated tray unloading mechanisms), singulation or shingulation devices, and/or any other type of equipment or machine configured to collect, scan, weigh, measure, sort, order, combine, separate, analyze, transport, load, unload, singulate, shingulate, create, destroy, or otherwise process items.

The monitoring devices 130 may include one or more acoustic sensors such as microphones (e.g., condenser microphones, dynamic microphones, ribbon microphones, fiber-optic microphones, laser microphones, MEMS microphones, etc.), variable reluctance sensors, piezoelectric sensors, or any other transducer capable of producing a signal based on a received sound or vibration. The monitoring devices 130 may further additional sensors configured to detect non-audio information, for example, video cameras, still cameras, thermal imagers, mechanical or electrical sensors, or the like. The monitoring devices 130 may further include processing circuitry in communication with the sensors and configured to control the collection, storage, and/or analysis of data collected by the sensors, and to communicate with external systems such as a controller of the equipment, remote computing devices, or the like. Monitoring devices 130 will be described in greater detail with reference to FIG. 2.

The monitoring devices 130 are in communication with the server 150 via a wired or wireless connection. In some embodiments, the server 150 may be in communication with the monitoring devices 130 of equipment 110 of a single facility (e.g., a hub, regional facility, or unit delivery facility of a distribution network, a single manufacturing or processing facility, a vehicle, or the like), or the server 150 may be in communication with monitoring devices 130 of equipment 110 distributed across any number of facilities. The server 150 may communicate with the monitoring devices 130 using any suitable wired or wireless communication network, such as a private network, personal area network, local area network, wide area network, cable network, satellite network, cellular telephone network, peer-to-peer network, etc. or a combination thereof, some or all of which may or may not have access to and/or from the Internet. In addition, the server 150 may comprise machine learning or artificial intelligence software configured to perform any of the higher-level functionality described herein (e.g., determining thresholds, baseline audio signature data, analyzing operational audio signature data, etc.).

In some embodiments, the server 150 is further in communication with one or more other remote computing devices via a network 180. The network 180 may be a publicly accessible network of linked networks, possibly operated by various distinct parties, such as the Internet. In other embodiments, the network 180 may include a private network, personal area network, local area network, wide area network, cable network, satellite network, cellular telephone network, peer-to-peer network, etc. or a combination thereof, some or all of which may or may not have access to and/or from the Internet. For example, a plurality of servers 150 of different acoustic monitoring systems 100 may be associated with a cloud network. In some embodiments, the server 150 may communicate via the network 180 with one or more remote user interfaces 170.

Each piece of equipment 110 may include a variety of components such as actuators, bearings, linkages, belts, motors, scanners, diverters, rollers, or other elements that move or operate during ordinary operation of the equipment 110. Typically, the various moving components of any piece of equipment 110 are capable of failing or malfunctioning during sustained or recurrent operation. In mechanical systems, a failure or malfunction may result from a sudden breakage and/or from gradual wear and tear. Accordingly, monitoring devices 130 can be configured to detect irregular sounds associated with a malfunction (e.g., breakage of a component, improper functioning of the component or equipment, loose fasteners, rattles, excessive vibration, imbalances, etc.) and/or irregular sounds associated with non-malfunction wear and tear (e.g., a component producing a sound indicative of wear while the component or equipment continues functioning properly). Monitoring devices 130 and methods for monitoring equipment 110 using monitoring devices 130 will be described in greater detail with reference to FIGS. 2-5.

User interface 170 may be a graphical user interface ("GUI") or interactive user interface. The user interface 170 may include one or more computing devices such as a mobile device, a desktop computer, a network connected display device located in a visible area of a facility where the equipment 110 is located, or other suitable user device. A user interface 170 may comprise one or more software programs stored in memory. The user interface 170 is configured to receive inputs and generate outputs according to program instructions. The outputs may include visual outputs displayed on a display screen, audio alerts played via one or more speakers, notifications sent to mobile devices operated by one or more technicians, etc.

In some embodiments, the user interface 170 may be operated by and/or accessible to operators of the equipment 110, supervisors and/or technicians at a facility where equipment 110 is located, technicians remote from the facility who may travel to the facility when equipment maintenance is required, etc. In some embodiments, the user interface 170 may be configured to display alerts generated at the server 150 and/or instructions generated at the server 150 or at the user interface 170 based on the generated alerts. For example, an alert associated with a malfunctioning piece of equipment 110 may cause the user interface 170 to display an indication that a repair is needed at the location of the equipment 110. In some embodiments, the user interface 170 can be a tool for an operator or supervisor or technician to review, diagnose, and correct potential issues, request maintenance, and interact with components. In some embodiments, the user interface 170 can receive parameters for the automated monitoring and taking corrective actions by the system 100, without need for additional operator or user input.

Figure 2:
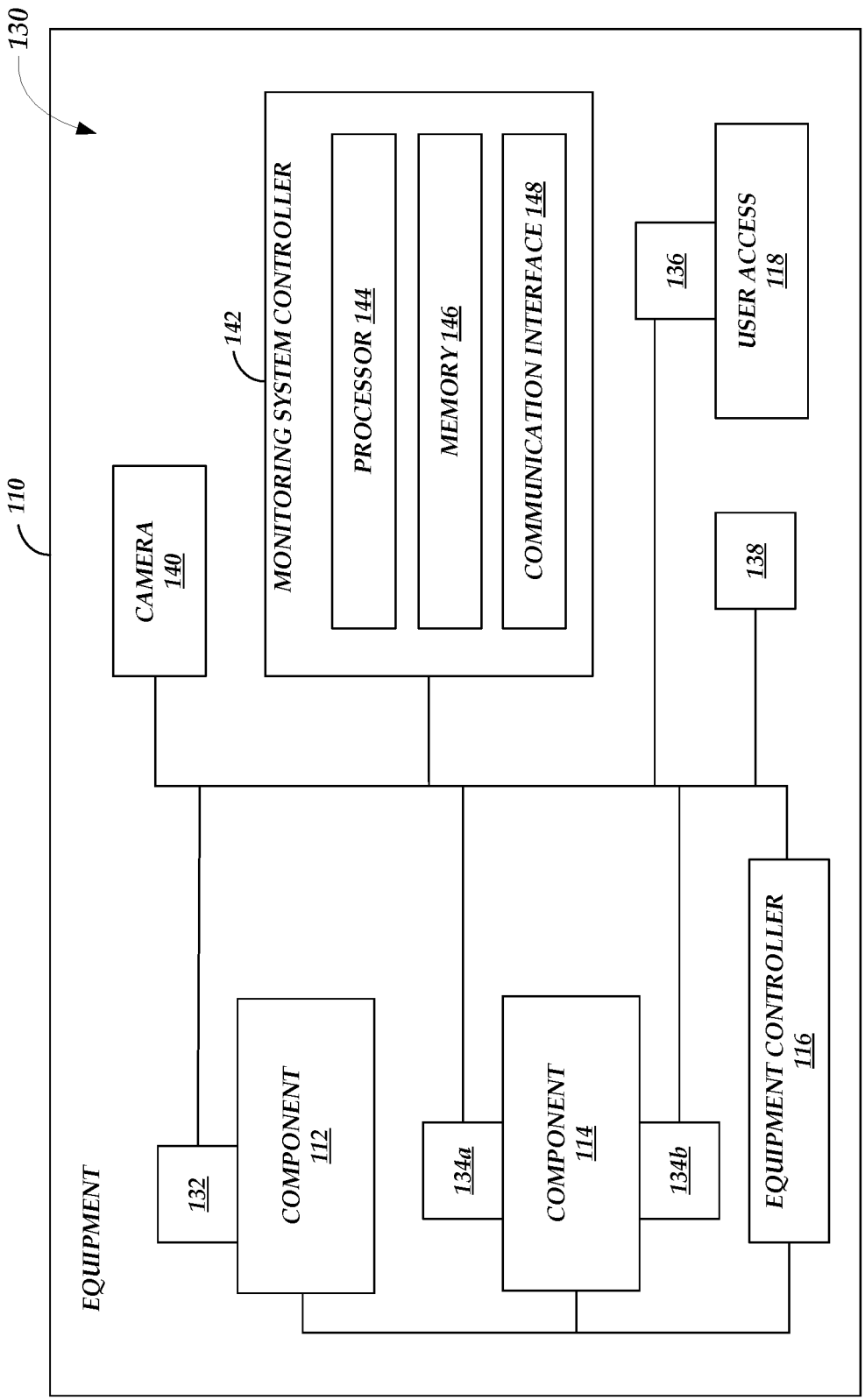
FIG. 2 is a block diagram schematically illustrating an example item processing apparatus equipped with an acoustic monitoring system.

FIG. 2 is a block diagram illustrating an example piece of equipment 110, such as an item processing apparatus or other equipment, configured to be monitored by monitoring devices 130 in accordance with the present technology. The equipment 110 may be any type of equipment having one or more components that produce sound during operation. For example, in the exemplary context of a distribution network facility, the equipment 110 may be a sorter, facer-canceler system, conveyor, loading or unloading device (e.g., rotationally and/or linearly actuated tray unloading mechanisms), singulation or shingulation device, and/or any other type of equipment or machine configured to collect, scan, weigh, measure, sort, order, combine, separate, analyze, transport, load, unload, singulate, shingulate, or otherwise process items.

The equipment 110 includes one or more components 112, 114 to be monitored. An equipment controller 116 can electronically control operation of components 112 and 114, and may further be configured to control operation of any number of additional components not illustrated in FIG. 2. Although two acoustically monitored components 112, 114 are depicted in FIG. 2, the acoustic monitoring systems and methods disclosed herein may equally be applied to a single component or to more than two components of a piece of equipment 110. In various implementations, it may be desirable to monitor only a subset of all components within the equipment 110, for example, to reduce costs and/or complexity. Monitoring may be focused on those components that are relatively expensive and/or hard to repair, as well as components that can serve as a single point of failure for the equipment 110 and/or components that have a relatively long maintenance window.

The components 112, 114 may be any type of equipment component that produces sound, vibrations, oscillations, etc. in operation. In one non-limiting example, component 112 may be a linear pneumatic actuator and component 114 may be a linear servo actuator. A linear pneumatic actuator may include subcomponents such as, for example, one or more air supply lines, air brakes, and/or air cylinders having internal and/or external seals. A linear servo actuator may include subcomponents such as, for example, linear bearings, gearboxes, and/or belts. The equipment controller 116 is in communication with components 112 and 114 and may be configured to control components 112 and 114 and/or subcomponents thereof to activate, deactivate, and/or operate the equipment 110.

In some embodiments, the equipment 110 further includes a user access 118. The user access 118 may be a portion or area on, within, or around the equipment 110 configured to be accessed by a user while the equipment is operating. For example, the user access 118 may be an area where a control panel or other user control devices are present, or an area configured for a user to interact with the equipment 110 such as by placing item or trays into the equipment 110 or receiving items or trays from the equipment. As will be described in greater detail, it may be desirable to monitor the user access 118 for improved user safety.

The monitoring devices 130 include one or more acoustic sensors positioned to receive sounds generated by operation of the equipment 110. In the example of FIG. 2, the monitoring devices 130 include acoustic sensors 132, 134a, 134b, 136, and 138. The monitoring devices 130 can further include non-acoustic sensors such as a camera 140. A monitoring system controller 142 is in communication with the acoustic and non-acoustic sensors and includes a processor 144, a memory 146, and a communication interface 148.

In the example configuration of FIG. 2, component 112 is monitored by a single acoustic sensor 132. Some components, such as component 114, may be monitored by two or more acoustic sensors 134a, 134b, for example, if it is desired to monitor two subcomponents individually, or to use two separate locations to monitor the machine or one component. By using two sensors on a single piece of equipment, background noises can be compared between the two and sounds that are common between the two sensor locations, such as background noises, ambient noises, etc., can be removed from the signal to improve monitoring accuracy. One or more acoustic sensors, such as acoustic sensor 136, may be disposed to monitor the user access 118 to detect sounds of user distress such as a scream, shout, or verbal command (e.g., if a user is injured or trapped by the equipment 110 in a location where the user cannot reach an emergency stop control). One or more additional acoustic sensors, such as acoustic sensor 138, may be independent of a specific component, and may be configured to monitor the sound produced by the entire piece of equipment 110. In some embodiments, one or more acoustic sensors such as acoustic sensor 138 may be configured to monitor one or more components of the piece of equipment 110 and/or one or more components of an additional piece of equipment in proximity to the piece of equipment 110.

The acoustic sensors 132, 134a, 134b, 136, and 138 may be, for example, microphones such as condenser microphones, dynamic microphones, ribbon microphones, fiber-optic microphones, laser microphones, MEMS microphones, etc. In some embodiments, the acoustic sensors 132, 134a, 134b, 136, and 138 may include two or more different types of microphones. For example, an acoustic sensor 132, 134a, 134b disposed to monitor a particular component or subcomponent may be a directional microphone while an acoustic sensor 136, 138 disposed to monitor the user access 118 or the collective sound of the equipment 110 may be an omnidirectional microphone.

The monitoring system controller 142 is in wired or wireless electronic communication with the acoustic sensors 132, 134a, 134b, 136, 138, any non-acoustic sensors such as camera 140, and the equipment controller 116. The processor 144 can receive audio recorded by the acoustic sensors 132, 134a, 134b, 136, 138 and/or audio signature data generated based on the audio, and can cause storage of the audio and/or audio signature data in the memory 146. The processor can further receive photos or video captured at the camera 140 and can cause storage of the photos or video in the memory 146. The photos can have a time stamp attached thereto which can be correlated or matched to time stamps for the audio or acoustic sensor information.

The processor 144 may further be configured to analyze audio or visual data received from the acoustic sensors 132, 134a, 134b, 136, 138 and/or from the camera 140. For example, the processor 144 may receive raw audio data and generate audio signature data based on the raw audio date (e.g., by determining one or more quantitative values based on a waveform, frequency, period, amplitude, and/or other characteristic of the raw audio data). In another example, the processor 144 may be configured to analyze the audio signature data such as by comparing operational audio signature data to baseline audio signature data stored in the memory 146 to detect abnormal operational audio signature data.

The processor 144 may be configured to communicate with the equipment controller 116. In some embodiments, the equipment controller 116 is configured to send signals to the processor 144 indicating when the equipment 110 begins and ceases operation. In such embodiments, the processor 144 can trigger acoustic monitoring based on receiving a signal indicating that the equipment 110 is operating and/or can discontinue monitoring based on receiving a signal indicting that the equipment 110 is shutting down. In some embodiments, equipment may generate or emit sounds on start-up or shut down which deviate from a baseline audio signature, but which do not indicate a problem. Thus, the processor 144 can ignore deviations from baseline audio signals in equipment which is starting up or shutting down. In some embodiments, the monitoring system controller may have a start-up or shut down baseline audio signature. When the equipment controller 116 sends the startup or shutdown signals to the processor 144, the processor 144 can compare the received signals with the startup and shutdown baseline audio signals.

In some embodiments, the processor 144 is configured to modify or control operation of the equipment 110 based on audio signature data analysis. For example, if acoustic sensor 136 detects a sound associated with distress (e.g., a scream or shout) in or near the user access 118, the processor 144 may process the sound (e.g., the raw audio data recorded at acoustic sensor 136 and/or audio signature data generated based on the raw data) and detect the user distress sound (e.g., by comparison to distress-related audio signature data stored in the memory 146). In response to detecting the user distress sound, the processor 144 may send an emergency stop signal to the equipment controller 116 that causes the equipment controller 116 to deactivate the equipment 110 so as to avoid further injury to the user and to allow the user to be removed or freed from the equipment 110. In another example, the processor 144 may be configured to send an emergency stop signal to the equipment controller 116 if a malfunction is detected in a component or a subcomponent thereof so as to avoid causing further damage to the equipment 110 by continued operation with a malfunctioning component.

The processor 144 may further be configured to communicate with one or more remote computing device, such as a server 150 (FIG. 1) via the communication interface 148. The communication interface 148 may be configured to send alerts or notifications to the server 150, such as to indicate malfunctions, safety emergencies, or other abnormal audio signature events that are detected by the monitoring devices 130. In some embodiments, an alert sent to the server 150 from the communication interface 148 in response to a safety emergency or a malfunction may cause the server 150 to notify maintenance personnel or technicians to respond to the location of the equipment 110 to fix the equipment or assist the user. In some embodiments, a notification sent to the server 150 from the communication interface 148 in response to a non-malfunction abnormal audio signature (e.g., a sound associated with wear and tear indicating that a component or subcomponent is likely to fail imminently or sooner than planned) may cause the server 150 to update a maintenance schedule or the like so as to accelerate a predetermined maintenance schedule for the component or the equipment 110. In some embodiments, the server 150 may summon maintenance personnel for immediate action. In some embodiments, the server 150 may determine that equipment shutdown is required based on the received audio signature event, and can send signals to shutdown or secure equipment.

In some embodiments, some or all audio signature analysis may be carried out remotely, such as at the server 150, rather than at the processor 144 of the monitoring system controller 142 as described above. For example, in some embodiments, the memory 146 may store baseline audio signature data for the various acoustic sensors 132, 134a, 134b, 136, 138; during operating, the processor 144 may compare operational audio signature data to the stored baseline audio signature data, but may send any abnormal operational audio signature data to the server 150 for analysis rather than performing the analysis locally. In some embodiments, the baseline audio signature data may only be stored remotely at the server 150, and the monitoring system controller 142 may send operational audio signature data to the server 150 for comparison to the baseline audio signature data and any further analysis.

The memory 146 may include computer program and/or operating instructions that the processor 144 executes in order to implement one or more embodiments. The memory 146 can store an operating system that provides computer program instructions for use by the processor 144 in the general administration and operation of the monitoring system controller 142. The memory 146 can further include operating instructions, such as computer program instructions and other information for implementing aspects of the present disclosure. For example, in some embodiments, the memory 144 may include a set of processing instructions that, e.g., implement one or more operations of the processes 400 and 500, described elsewhere herein, alone or in conjunction with a server 150 (FIGS. 1 and 3) or other remote computing devices.

Figure 3:
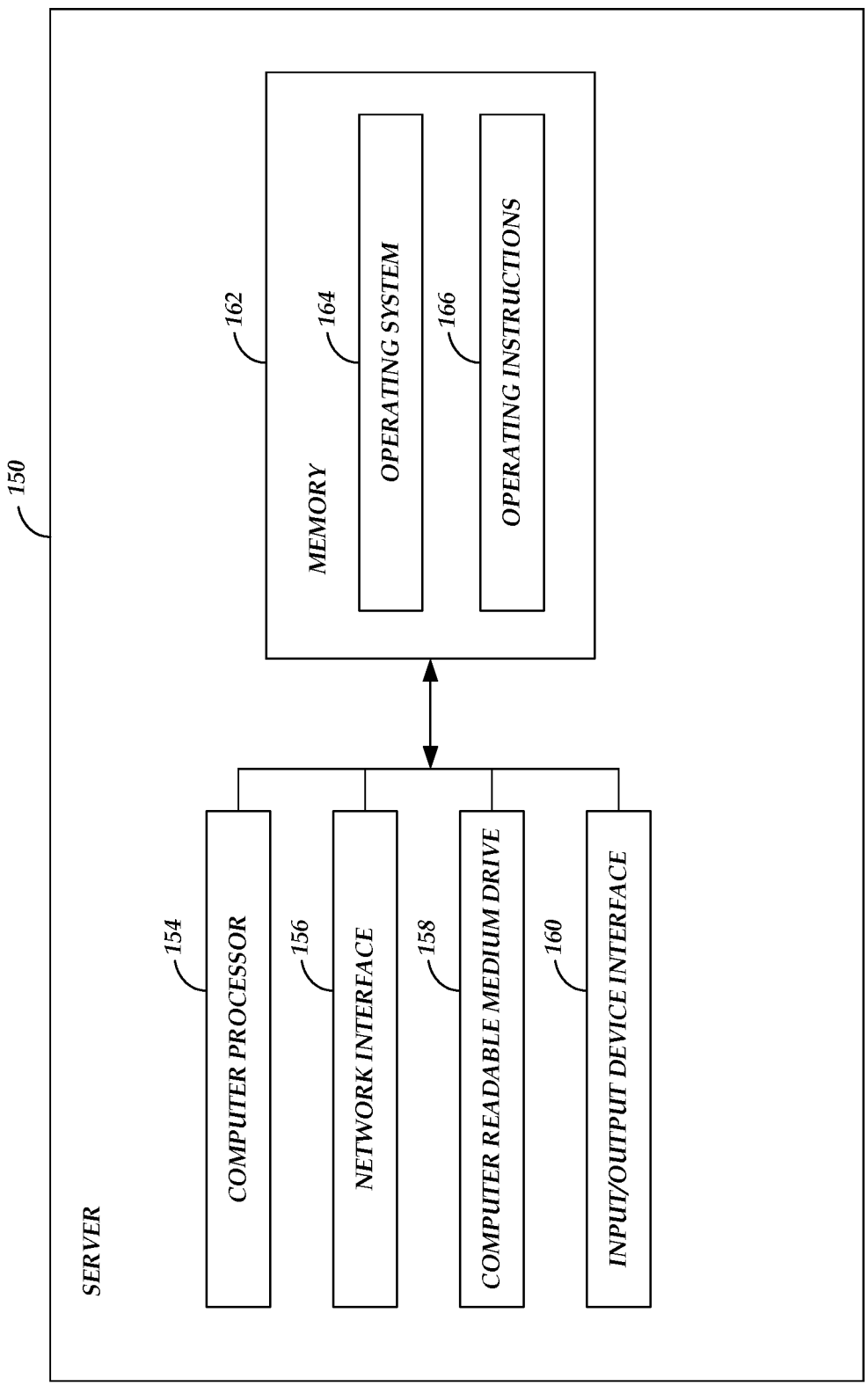
FIG. 3 is a block diagram schematically illustrating an example server that may be used in connection with the acoustic monitoring systems and methods disclosed herein.

FIG. 3 illustrates an example server 150 configured to execute the processes and implement the features described above in connection with, e.g., the systems, interfaces and/or the devices of FIGS. 1 and 2. In some embodiments, the server 150 may include one or more computer processors 154, such as physical CPUs; one or more network interfaces 156, such as a network interface cards ("NICs"); one or more computer readable medium drives 158, such as high density disk drives ("HDDs"), solid state drives ("SDDs"), flash drives, and/or other persistent non-transitory computer-readable media; an input/output device interface 160, such as an IO interface in communication with one or more external storage drives; and one or more computer readable memories 162, such as RAM and/or other volatile non-transitory computer-readable media.

The network interface 156 can provide connectivity to one or more networks or computing systems, such as a monitoring system controller 142 (FIG. 2). The computer processor 154 can receive information and instructions from other computing systems or services via the network interface 156. The network interface 156 can also store data directly to the computer-readable memory 162. The computer processor 154 can communicate to and from the computer-readable memory 162, execute instructions and process data in the computer readable memory 162, etc.

The computer readable memory 162 may include computer program and/or operating instructions that the computer processor 154 executes in order to implement one or more embodiments. The computer readable memory 162 can store an operating system 164 that provides computer program instructions for use by the computer processor 152 in the general administration and operation of the server 150. The computer readable memory 162 can further include operating instructions 166, such as computer program instructions and other information for implementing aspects of the present disclosure. For example, in some embodiments, the computer readable memory 162 may include a set of processing instructions that, e.g., implement one or more operations of the processes 400 and 500, described elsewhere herein, alone or in conjunction with one or more monitoring system controllers 142 (FIG. 2) of one or more pieces of equipment 110 (FIGS. 1-2).

Figure 4:
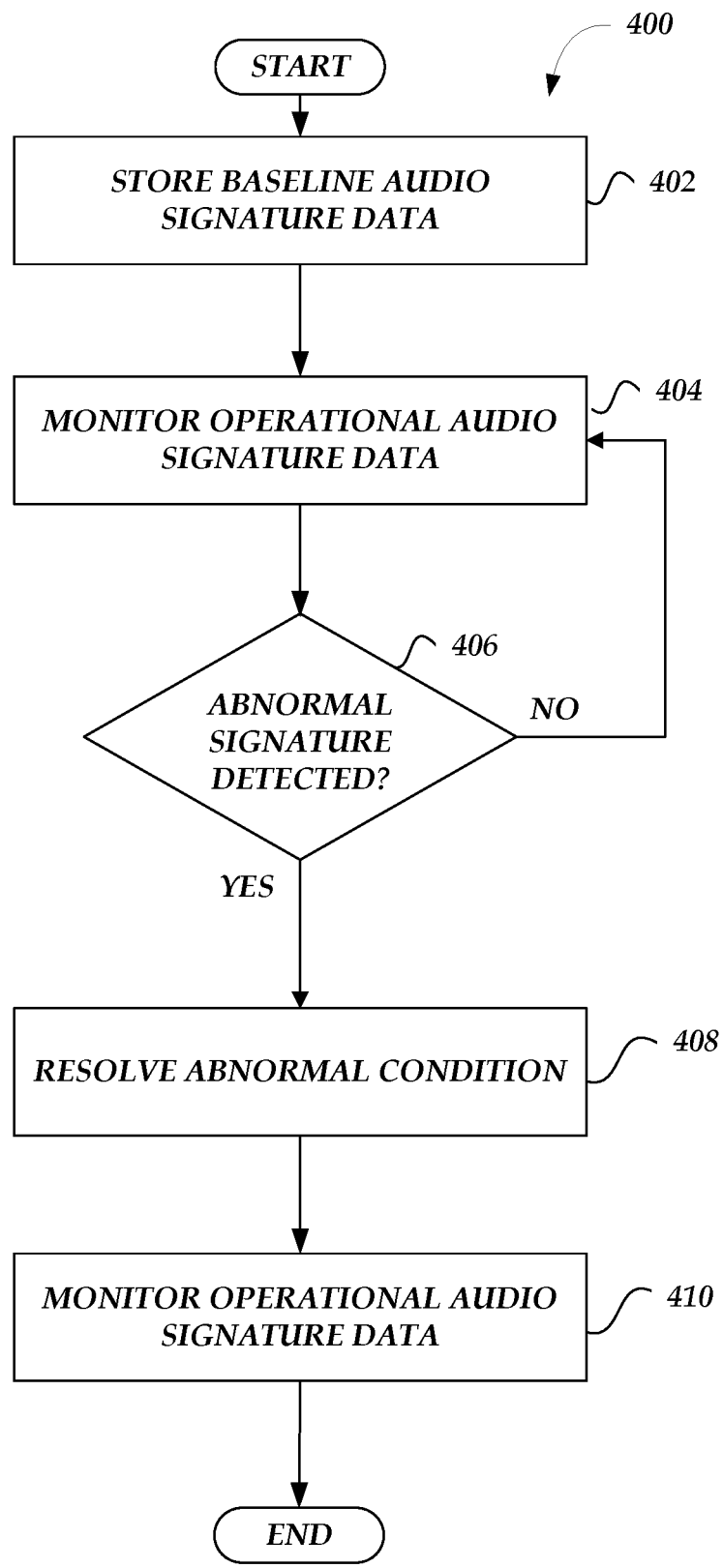
FIG. 4 is a flowchart illustrating an example method of monitoring equipment and/or processes based on acoustic information.

FIG. 4 is a flowchart illustrating an example method 400 of monitoring equipment and/or processes based on acoustic information. The method 400 will be described in connection with the example system shown in FIGS. 1-3. However, the examples are for illustration only, and are not intended to be limiting. In some embodiments, the method 400 or portions thereof may be used in connection with different data structures. For example, although the processing operations of the method 400 will be described primarily with reference to the monitoring system controller 142, some or all of the method 400 may equally be performed remotely, such as by a sever 150 in conjunction with the monitoring system controller 142.

The method 400 shown in FIG. 4 begins at block 402 with the storage of baseline audio signature data for individual acoustic sensors, such as acoustic sensors 132, 134*a*, 134*b*, 136, and/or 138, installed on, within, or proximate one or more pieces of equipment 110. In some embodiments, the baseline audio signature data for an individual sensor may be generated by recording sound at the sensor while the corresponding piece of equipment 110 is operating in a normal operational state. For example, the sound may be recorded while the equipment 110 is in operation shortly after an inspection or maintenance in which it was determined that the equipment and/or components thereof are operating normally. The sound recorded for the baseline audio signature may be of a suitable duration to accurately reflect the operation of the relevant component. For example, for a sensor positioned to monitor operation of a belt or belt pulley that makes a continuous sound during operation, or to monitor a conduit such as an air supply line for leakage, a relatively short recording, such as 0.5 seconds, 1 second, 2 seconds, 3 seconds, 5 seconds, or more, or any duration therebetween, may be recorded to establish the baseline audio signature. For a sensor positioned to monitor operation of an intermittently operating component, such as an air cylinder, the duration of the baseline recording may be selected to be longer than an expected time period between consecutive actuations (e.g., up to 5 seconds, 10 seconds, 15 seconds, 20 seconds, or more, or any duration therebetween).

When audio has been recorded during a normal operational condition, baseline audio signature data may be generated based on the recorded sound. For example, the processor 144 may trim the recorded audio file to a desired duration. In some embodiments, such as to improve the efficiency of processing resources and reduce data storage and processing requirements, the processor 144 may calculate or otherwise generate one or more quantitative values based on the recorded sound of normal operation, such as an acoustic fingerprint, average zero crossing rate, bandwidth, frequency band characteristic, file hash, resampling, or any other suitable quantitative value that characterizes a waveform recorded by the sensor. In some embodiments, the baseline audio signature data may be the sound file generated by recording the normal operation without further processing. The processor 144 may then cause the generated baseline audio signature data to be stored, such as in the memory 146. After the baseline audio signature data is generated and stored, the method 400 continues to block 404.

At block 404, operational audio signature data is monitored while the equipment 110 operates. The processor 144 may control the collection of operational audio signature data in substantially the same manner as the baseline audio signature data was collected. For example, the processor 144 may cause the individual sensors to record audio continuously or periodically, and may cause generation and storage in the memory 146 of operational audio signature data.

Preferably, any processing performed based on the operational audio recorded at the individual sensors is processed by the same or substantially the same processing steps performed in generating the baseline audio signature data. In some embodiments, the monitoring of operational audio signature data is performed while the equipment 110 is operating and may be discontinued while the equipment 110 is not operating.

In some embodiments, the processor 144 identifies a particular operation which the equipment 110 is performing and uses the baseline audio signature data for the particular operation to monitor. If the equipment 110 changes operation, and/or if external operating conditions change, then the processor 144 determines or detects the new operation and/or conditions, and uses the baseline audio signature data for the new operation and/or the new operating conditions for the monitoring step. In some embodiments, the processor 144 selects the appropriate baseline audio signature data based on a comparison of the operational audio signature data to two or more sets of stored baseline audio signature data. For example, if the operational audio signature data is a close match to one stored baseline audio signature, the matching baseline audio signature may be selected as the appropriate baseline audio signature for comparison.

At decision state 406, the processor 144 determines whether an abnormal audio signature has been detected. After operational audio signature data is generated at block 404, the generated operational audio signature data is compared to block 406 to the stored baseline audio signature data corresponding to the same acoustic sensor. For example, the processor 144 may apply any suitable comparison algorithm which may include a subtraction operation followed by thresholding, or the like. A predetermined threshold may be used, such that an abnormal audio signature is determined if the difference between the operational audio signature data and the baseline audio signature data is greater than the predetermined threshold. In some embodiments, the predetermined threshold may be modified to improve detection reliability or sensitivity, and/or to reduce the occurrence of false negative or false positive results. In some embodiments, based on detecting an operational audio signature that differs from the selected baseline audio signature data, the processor 144 may further compare the operational audio signature to one or more other stored baseline audio signatures, if available. If the operational audio signature closely matches a different one of a plurality of stored baseline audio signatures, the processor 144 may determine that an operating condition has changed, and may select the matching baseline audio signature for further monitoring, rather than determining that an abnormal condition has occurred. In some embodiments, the operational audio signature may further be compared to one or more known abnormal audio signatures, if available. For example, if a sensor is monitoring a particular component which may be prone to two or more different failure modes, the operational audio signature may be compared to known audio signatures associated with the different failure modes to identify which type of abnormality is present. In another example, where a sensor is monitoring a plurality of components, the operational audio signature may be compared to known audio signatures associated with abnormal operating conditions of the individual monitored components in order to identify which component is experiencing an abnormal condition. If it is determined at decision state 406 that the operational audio signature data does not include an abnormal audio signature, the method 400 returns to block 404 to continue monitoring operational audio signature data. If it is determined at decision state 406 that the operational audio signature data does include an abnormal audio signature, the method 400 continues to block 408.

At block 408, the system takes an action to resolve the abnormal condition indicated by the abnormal audio signature. Resolving the abnormal condition may include sending one or more alerts, stopping operation of the equipment 110 associated with the individual sensor where the abnormal audio signature was detected, updating a preventive or predictive maintenance schedule, etc. In some embodiments, the equipment 110 can change from a first operating condition to a second operating condition. For example, if equipment 110 is operating at a prescribed or set speed or capacity, the equipment 100, when the abnormal condition is detected, can automatically be changed to operate at a lower speed, lower capacity, or the like. In some embodiments, multiple thresholds for abnormal audio signatures can be set. When a first threshold is reached, an alert may be generated and sent to the server 150 and/or to an operator. The first threshold can be a lower threshold, where the audio signal departs from the baseline, but does not significantly depart, which could indicate that the equipment 110 is not going to imminently fail, but that attention is needed. At a second threshold, which indicates a larger departure from the baseline than the first threshold, the equipment may move to an alternate operation mode, may decrease speed, etc., and may alert an operator and/or the server 150. At a third threshold, which indicates a larger departure from the baseline than the first and second thresholds, may cause the equipment to shut down, because a failure is imminent. Methods of resolving abnormal conditions based on abnormal audio signature data are described in greater detail with reference to FIG. 5. After the abnormal condition has been resolved, the method continues to block 410.

At block 410, the system may continue monitoring operational audio signature data after any resolution actions have occurred. For example, in some embodiments the resolution action may have involved a repair to the equipment 110 or a component 112, 114 thereof. In subsequent operation of the equipment 110 following the repair, the processor 144 may compare newly acquired operational audio signature data to the stored baseline audio signature data in order to confirm that the repair was completed correctly. In some embodiments, the resolution action may have involved replacement of a component or subcomponent that was expected to fail imminently. Following a confirmed replacement of the component or subcomponent, new baseline audio signature data may be captured in some implementations, in the event that the operation of the new component or subcomponent produces a slightly different sound relative to the replaced component or subcomponent. Additionally, in some embodiments, a threshold applied for detection of abnormal audio signature data may be updated during the subsequent monitoring of operational audio signature data at block 410. In some embodiments, for a set time after a replacement or repair of a component, the threshold for determining an abnormal signature or departure from baseline maybe changed to be more sensitive to a problem that requires intervention. For example, where a bearing or actuator is replaced, the threshold maybe changed such that a smaller departure from the baseline audio will trigger an alarm or corrective action as compared to the prior operational state. This allows for an earlier detection of a maintenance failure or a defective replacement component, or the like.

The method 400 may be repeated any number of times and/or may return to block 404 as the equipment 100 continues to operate.

Figure 5:
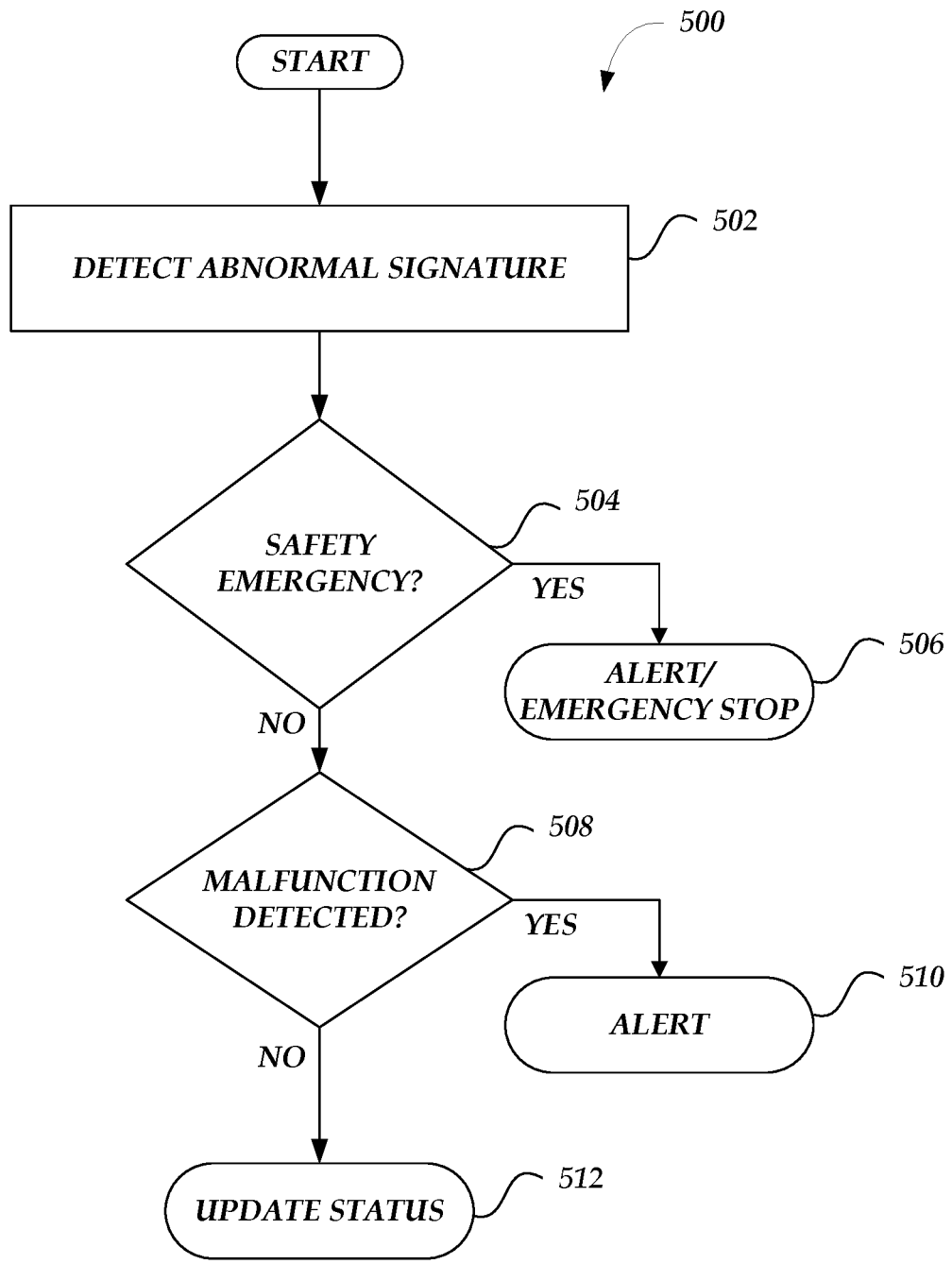
FIG. 5 is a flowchart illustrating an example method of resolving an abnormal audio signature condition.

FIG. 5 is a flowchart illustrating an example method of resolving an abnormal sound signature condition. The method 500 will be described in connection with the example system shown in FIGS. 1-3. However, the examples are for illustration only, and are not intended to be limiting. In some embodiments, the method 500 or portions thereof may be used in connection with different data structures. For example, although the processing operations of the method 500 will be described primarily with reference to the monitoring system controller 142, some or all of the method 500 may equally be performed remotely, such as by a sever 150 in conjunction with the monitoring system controller 142.

The method 500 begins at block 504 when an abnormal audio signature is detected. The abnormal audio signature may be detected, for example, at a server 150 or by a processor 144 of a monitoring system controller 142 of an acoustic monitoring system as described herein. In some embodiments, the abnormal audio signature may be detected during execution of the method 400 for monitoring equipment 110, as described above with reference to FIG. 4. When an abnormal audio signature is detected, the method 500 continues to decision state 504.

At decision state 504, the processor 144 determines whether the abnormal audio signature data is associated with a safety emergency. For example, in some embodiments, the processor 144 may compare the operational audio signature data to stored example audio signature data associated with user distress sounds such as screams, shouted commands such as "stop" or the like, or other sounds associated with safety emergencies. To identify a departure from the baseline audio signature, the processor 144 may apply any suitable comparison algorithm which may include a subtraction operation followed by thresholding, or the like. A predetermined threshold may be used, such that the abnormal audio signature is determined to indicate a safety emergency if the difference between the operational audio signature data and the stored example audio signature data is less than the predetermined threshold. In some embodiments, the predetermined threshold may be modified to reduce the occurrence of false negatives or false positives, so as to adequately protect users of the equipment 110 while avoiding unnecessary emergency stops. In some embodiments, a the processor 144 may identify a safety emergency when a received audio signal deviates from the baseline audio signature by an amount greater than a threshold, which can be termed an emergency threshold. If the received signal deviates by more than the emergency threshold, the processor 144 identifies a safety emergency and takes safety remedial action.

If it is determined at decision state 504 that the abnormal audio signature indicates a safety emergency, the method 500 continues to block 506. At block 506, the processor 144 causes an emergency stop. For example, the processor 144 may send a control signal to the equipment controller 116 that causes the equipment controller to immediately discontinue operation of the components 112, 114. The processor 144 may further generate an alert, such as by sending an alert signal to the server 150. Based on receiving the alert signal associated with a safety emergency, the server 150 can cause a technician and/or emergency personnel to be dispatched to the location of the equipment 110 to assist the distressed user and/or repair any damage caused by the safety emergency. The method terminates at block 506.

If it is determined at decision state 504 that the abnormal audio signature does not indicate a safety emergency, the method 500 continues to block 508. At block 508, the processor 144 determines whether the non-emergency abnormal audio signature data is associated with a malfunction. A malfunction may include, for example, an operational failure of a piece of equipment or of a component or subcomponent thereof. In some cases, the processor 144 may detect an absence of sound or a significantly reduced volume of sound if the monitored equipment, component, or subcomponent has ceased operation entirely. In some embodiments, the processor 144 may compare the operational audio signature data to stored example audio signature data associated with known failure modes of the monitored component or subcomponent (e.g., stored audio signatures corresponding to an incorrectly tensioned belt, a failed internal or external air cylinder seal, a failed air brake, a crashing sound, or the like). For example, the processor 144 may compare the operational audio with a plurality of stored example audio signatures to determine which of the known failure modes is present, if any. In another example, if a sensor is monitoring a plurality of components or pieces of equipment, the processor 144 may compare the operational audio signature data to stored example audio signature data associated with known failure modes of the different components or pieces of equipment being monitored by the individual sensor, so as to determine based on the abnormal audio signature data which component or piece of equipment is malfunctioning. The processor 144 may apply any suitable comparison algorithm which may include a subtraction operation followed by thresholding, or the like. A predetermined threshold may be used, such that the abnormal audio signature is determined to indicate a malfunction if the difference between the operational audio signature data and the stored example audio signature data is less than the predetermined threshold. In some embodiments, the predetermined threshold may be modified to reduce the occurrence of false negatives or false positives.

If it is determined at decision state 508 that the abnormal audio signature indicates a malfunction, the method 500 continues to block 510. At block 510, the processor 144 generates an alert, such as by sending an alert signal to the server 150. Based on receiving the alert signal associated with a safety emergency, the server 150 can cause a technician to be dispatched to the location of the equipment 110 to repair the malfunctioning equipment, component, and/or subcomponent. In some embodiments, the processor 144 may further send a control signal to the equipment controller to discontinue operation of the equipment 110 (e.g., if the abnormal audio signature data indicates that the equipment 110 is still operating despite failure of a component or subcomponent) either immediately or after a predetermined time interval, to prevent restarting of the equipment 110 after the next time the equipment is shut down, or to reduce a speed, capacity, or functionality (e.g., by disabling one or more functions of a multi-functional piece of equipment), or changing a mode of operation of the equipment, so as to avoid further damage to the equipment 110 from continued operation in a malfunction condition. The method terminates at block 510.

If it is determined at decision state 508 that the abnormal audio signature does not indicate a malfunction, the method 500 terminates at block 512 and may cause an update to a status associated with the component or subcomponent monitored by the acoustic sensor corresponding to the abnormal audio signature. In some embodiments, the processor 144 sends a notification to the server 150 or other remote computing device associated with maintenance of the equipment 110. For example, the notification may cause an update to a maintenance record or schedule based on the abnormal audio signature data. The maintenance record or schedule may be updated, for example, to accelerate a planned maintenance interval, to add a record of the detected abnormality, or otherwise update the maintenance record or schedule such that any non-urgent defect or wear in the monitored equipment, component or subcomponent can be addressed in a timely manner by maintenance personnel.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the disclosed technology should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the disclosed technology. This disclosed technology is susceptible to modifications in the methods and materials, as well as alterations in the systems and equipment. Such modifications will become apparent to those skilled in the art from a consideration of this disclosure or practice of the technology disclosed herein. Consequently, it is not intended that the disclosed technology be limited to the specific embodiments disclosed herein, but that it cover all modifications and alternatives coming within the true scope and spirit of the disclosed technology.

What is claimed is:

1. An acoustic monitoring system comprising:
   one or more acoustic sensors disposed on, within, or proximate one or more pieces of equipment, the one or more acoustic sensors configured to record sound; and
   a server in communication with the one or more acoustic sensors, the server comprising memory and one or more processors configured, for each individual acoustic sensor of the one or more acoustic sensors, to:
      monitor, using the acoustic sensor, sound generated by the component during subsequent operation of the one or more pieces of equipment to generate operational audio signature data;
      compare the operational audio signature data to a stored baseline audio signature data;

determine that the operational audio signature data corresponds to an abnormal condition associated with the at least one component based on comparing the operational audio signature data to the stored baseline audio signature data; and generate an alert indicative of the abnormal condition.

2. The system of claim 1, wherein the at least one component comprises at least one of a linear servo actuator and a linear pneumatic actuator.

3. The system of claim 1, wherein the baseline audio signature data comprises at least one quantitative value calculated based on the recorded sound.

4. The system of claim 3, wherein the one or more processors detect the abnormal condition based on a difference between the at least one quantitative value and a corresponding quantitative value of the operational audio signature data exceeding a threshold.

5. The system of claim 1, wherein the one or more processors are further configured to detect operation of the one or more pieces of equipment, and to trigger the monitoring based on detecting the operation of the one or more pieces of equipment.

6. The system of claim 1, wherein the one or more processors are further configured to determine a type of the abnormal condition, and wherein the alert is generated based on the type of the abnormal condition.

7. The system of claim 6, wherein the abnormal condition comprises a malfunctioning one of the at least one component and wherein the alert causes, at least in part, a repair of the malfunctioning component.

8. The system of claim 7, wherein the one or more processors are further configured to monitor sound generated by the malfunctioning component subsequent to the repair to verify effectiveness of the repair.

9. The system of claim 6, wherein determining the type of the abnormal condition comprises comparing, by the one or more processors, the operational audio signature data to one or more stored example audio signatures associated with known types of abnormal conditions.

10. The system of claim 1, wherein the one or more processors are in communication with control circuitry of the piece of equipment including the component, the one or more processors further configured to:

detect, based on the operational audio signature data, a human distress sound associated with the piece of equipment; and cause the piece of equipment to cease operating based on the detected human distress sound.

11. The system of claim 1, further comprising at least one camera, the one or more processors further configured to detect an abnormal condition based on a correlation of the operational audio signature data with still image data or video image data captured by the at least one camera.

12. A method for monitoring equipment, the method comprising:

placing one or more acoustic sensors of an acoustic monitoring system on, within, or proximate one or more pieces of equipment; and for each individual acoustic sensor of the one or more acoustic sensors:

monitoring, using the acoustic sensor, sound generated by the component during subsequent operation of the one or more pieces of equipment to generate operational audio signature data;

comparing, by a server processor of the acoustic monitoring system, the operational audio signature data to stored baseline audio signature data;

detecting an abnormal condition associated with the component based on comparing the operational audio signature data to the stored baseline audio signature data; and generating an alert indicative of the abnormal condition.

13. The method of claim 12, wherein the baseline audio signature data comprises at least one quantitative value calculated based on the recorded sound.

14. The method of claim 13, wherein the abnormal condition is detected based on a difference between the at least one quantitative value and a corresponding quantitative value of the operational audio signature data exceeding a threshold.

15. The method of claim 12, further comprising:

detecting operation of the one or more pieces of equipment; and triggering the monitoring based on detecting the operation of the one or more pieces of equipment.

16. The method of claim 12, further comprising determining a type of the abnormal condition, and wherein the alert is generated based on the type of the abnormal condition.

17. The method of claim 16, wherein the abnormal condition comprises a malfunctioning one of the at least one component and wherein the alert causes, at least in part, a repair of the malfunctioning component.

18. The method of claim 17, further comprising monitoring sound generated by the malfunctioning component subsequent to the repair to verify effectiveness of the repair.

19. The method of claim 12, further comprising controlling the one or more pieces of equipment based at least in part on the alert.

20. The method of claim 19, further comprising:

detecting, based on the operational audio signature data, a human distress sound associated with the piece of equipment; and causing the piece of equipment to cease operating based on the detected human distress sound.

* * * * *